United States Patent
Manor et al.

(10) Patent No.: US 10,817,883 B2
(45) Date of Patent: *Oct. 27, 2020

(54) CREATIVE QUALITY VALIDATION

(71) Applicant: Google LLC, Mountain View, CA (US)

(72) Inventors: Eyal Manor, Plainview, NY (US); Ola Abiri, Woodbridge, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,721

(22) Filed: Jan. 15, 2019

(65) Prior Publication Data

US 2019/0147460 A1 May 16, 2019

Related U.S. Application Data

(63) Continuation of application No. 12/873,535, filed on Sep. 1, 2010, now Pat. No. 10,198,734.

(51) Int. Cl.
*G06Q 30/02* (2012.01)

(52) U.S. Cl.
CPC ......... *G06Q 30/02* (2013.01); *G06Q 30/0277* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 9,009,834 B1* | 4/2015 | Ren | G06F 21/10 709/224 |
| 2004/0128529 A1 | 7/2004 | Blake et al. | |
| 2009/0031216 A1* | 1/2009 | Dressel | G06F 16/958 715/255 |
| 2009/0094175 A1* | 4/2009 | Provos | G06F 21/564 706/12 |
| 2011/0283360 A1* | 11/2011 | Abadi | H04L 63/1416 726/24 |
| 2011/0307496 A1 | 12/2011 | Jones et al. | |

FOREIGN PATENT DOCUMENTS

| | | |
|---|---|---|
| KR | 1020020004894 | 1/2002 |
| KR | 1020030030586 | 4/2003 |
| KR | 1020040084187 | 10/2004 |

(Continued)

OTHER PUBLICATIONS

Ford, Sean & Cova, Marco & Kruegel, Christopher & Vigna, Giovanni. (2009). Analyzing and Detecting Malicious Flash Advertisements. Proceedings—Annual Computer Security Applications Conference, ACSAC. 363-372. 10.1109/ACSAC.2009.41. (Year: 2009).*

(Continued)

*Primary Examiner* — Katherine Kolosowski-Gager
(74) *Attorney, Agent, or Firm* — Fish & Richardson P.C.

(57) ABSTRACT

A computer-implemented method includes generating an emulated view of an advertisement; determining, based on the emulated view, one or more elements associated with the advertisement; comparing the one or more elements to one or more criteria associated with an advertisement marketplace; and determining, based on comparing, whether the advertisement complies with the one or more criteria.

20 Claims, 5 Drawing Sheets

(56) References Cited

FOREIGN PATENT DOCUMENTS

KR   1020070111350   11/2007
KR   1020100016720   2/2010

OTHER PUBLICATIONS

Notice of Allowance issued in Korean Application No. 10-2013-7007944, dated Oct. 27, 2017, 4 pages.
Office Action issued in Australian Application No. 2011296129 dated Oct. 13, 2014, 3 pages.
Office Action issued in Canadian Application No. 2809978, dated May 10, 2017, 5 pages.
Office Action issued in Canadian Application No. 2809978, dated Apr. 24, 2018, 7 pages.
Office Action issued in Korean Application No. 10-2013-7007944, dated Apr. 18, 2017, 19 pages.
PCT International Search Report and Written Opinion of the International Searching Authority from PCT/US2011/049694, dated Apr. 12, 2012, 9 pages.

\* cited by examiner

CREATIVE QUALITY VALIDATION

CROSS-REFERENCE TO RELATED APPLICATION

This application is a continuation application of U.S. application Ser. No. 12/873,535, filed Sep. 1, 2010, which is incorporated by reference.

TECHNICAL FIELD

This document relates generally to generating an emulated view of a creative that is used to verify content of the creative.

BACKGROUND

A marketplace generally includes buyers who buy goods and sellers who sell goods. Examples of goods include books, cars, fruit, and so forth. One type of marketplace is a web advertising marketplace, such as real-time or spot market exchanges, an online marketplace, and so forth.

In the area of web advertising, a web advertising marketplace also includes buyers, sellers, and goods. However, in the web advertising marketplace, the goods sold include advertising space on a website, such as space for banner advertisements and other space that may be used for advertisements. The sellers sell advertising space on a website. The sellers are often referred to as "publishers," because the sellers are "publishing" a website that includes the advertising space. The buyers are referred to as "advertisers" because the buyers are purchasing advertising space for the placement of advertisements. Advertisements may be referred to as "creatives."

A web advertising marketplace may be generated by a "market-maker," which is an entity (e.g., a company, a firm, an individual) that generates a marketplace for buying and selling of advertising space. For example, a market-maker may generate a website in which publishers can post listings of advertising space for sale and advertisers can post bids to purchase the advertising space from the publishers. A web advertising marketplace may be an automatic marketplace (e.g., a real-time auction), in which a publisher's "offer price" (e.g., a price a publisher is willing to accept for placement of a creative on the publisher's website) is matched in real-time with an advertiser's "bid price" (e.g., a price an advertiser is willing to pay to place a creative on the publisher's website). When an advertiser's bid price matches a publisher's offer price, the advertiser's creative may be automatically sent to the publisher for display on the publisher's website.

To promote the quality of creatives, a market-maker may allow a publisher to specify the types of content the publisher is willing to have displayed on the publisher's website. For example, a publisher may specify that the publisher only wants to display creatives that meet pre-defined criteria, including, e.g., creatives that do not include malicious software, creatives that do not include "cookie dropping" cookies that cause a user who visits a website to receive a third-party cookie from a different website, creatives that are smaller than a certain size limit, such as creatives having a download size that does not exceed fifty kilobytes of data, and so forth. In an example, pre-defined criteria also may include criteria that are specified by a market-maker, as well as other criteria defined across the web advertisement marketplace.

SUMMARY

In one aspect of the present disclosure, a computer-implemented method includes generating an emulated view of an advertisement; determining, based on the emulated view, one or more elements associated with the advertisement; comparing the one or more elements to one or more criteria associated with an advertisement marketplace; and determining, based on the comparing, whether the advertisement complies with the one or more criteria.

Implementations of the disclosure may include one or more of the following features. In some implementations, the method further includes retrieving information indicative of a frequency interval at which to perform the comparing. The method may also include receiving information indicative of the advertisement; and associating the information indicative of the advertisement with one or more status indicators, wherein the one or more status indicators comprise information indicative of a compliance of the advertisement with the one or more criteria.

In other implementations, the one or more elements include one or more first elements, the advertisement includes a first advertisement, and the method further includes determining that a current time corresponds to a time specified by the frequency interval; scanning the one or more status indicators to determine one or more second advertisements associated with a non-compliant status indicator; retrieving one or more second elements associated with at least one of the one or more second advertisements; and comparing the one or more second elements to the one or more criteria.

In still other implementations, the one or more criteria include information indicative of one or more of (i) a policy prohibiting a download of cookies, (ii) a policy prohibiting an installation of malicious software, and (iii) a policy prohibiting a download of data that exceeds a pre-defined size. The method may also include generating, based on comparing, a score associated with the advertisement, wherein the score comprises information indicative of whether the advertisement complies with the one or more criteria.

In another aspect of the disclosure, one or more machine-readable media are configured to store instructions that are executable by one or more processing devices to perform functions including generating an emulated view of an advertisement; determining, based on the emulated view, one or more elements associated with the advertisement; comparing the one or more elements to one or more criteria associated with an advertisement marketplace; and determining, based on comparing, whether the advertisement complies with the one or more criteria. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform functions including: generating an emulated view of an advertisement; determining, based on the emulated view, one or more elements associated with the advertisement; comparing the one or more elements to one or more criteria associated with an advertisement marketplace; and determining, based on the comparing, whether the advertisement complies with the one or more criteria. Implementations of this aspect of the present disclosure can include one or more of the foregoing features.

In yet another aspect of the disclosure, an electronic system includes means for generating an emulated view of an advertisement; determining, based on the emulated view, one or more elements associated with the advertisement; comparing the one or more elements to one or more criteria associated with an advertisement marketplace; and determining, based on the comparing, whether the advertisement complies with the one or more criteria. Implementations of this aspect of the present disclosure can include one or more of the foregoing features.

In still an other aspect of the disclosure, a computer-implemented method of reviewing content of a creative to ensure an adherence with a policy of a publisher includes: receiving from a first computing device associated with the publisher one or more criteria defined by the publisher, wherein the one or more criteria comprise information indicative of one or more policies defined by the publisher regarding a display of a first creative on a website of the publisher; receiving from a second computing device associated with an advertiser information indicative of a second creative; generating an emulated view of the second creative, wherein the emulated view emulates a display of the second creative on the website of the publisher; monitoring the emulated view to determine an occurrence of one or more events associated with the second creative; comparing the one or more events associated with the second creative to the one or more criteria defined by the publisher; and determining, based on comparing, whether the second creative complies with the one or more criteria defined by the publisher.

Implementations of the disclosure may include one or more of the following features. In some implementations, the method also includes determining that the second creative complies with the one or more criteria defined by the publisher; and sending, to the first computing device associated with the publisher, the second advertisement. The method may additionally include determining that the second creative fails to comply with the one or more criteria defined by the publisher.

In other implementations, the method includes scanning information indicative of the second creative; and detecting, based on scanning, the occurrence of the one or more events. The method may also include scanning, at pre-defined intervals, the information indicative of the second creative. The method may additionally include detecting an update in content of the second creative; retrieving information indicative of the update in content of the second creative; and determining, based on the update in content of the second creative, whether the second creative complies with the one or more criteria defined by the publisher.

All or part of the foregoing may be implemented as a computer program product that includes instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
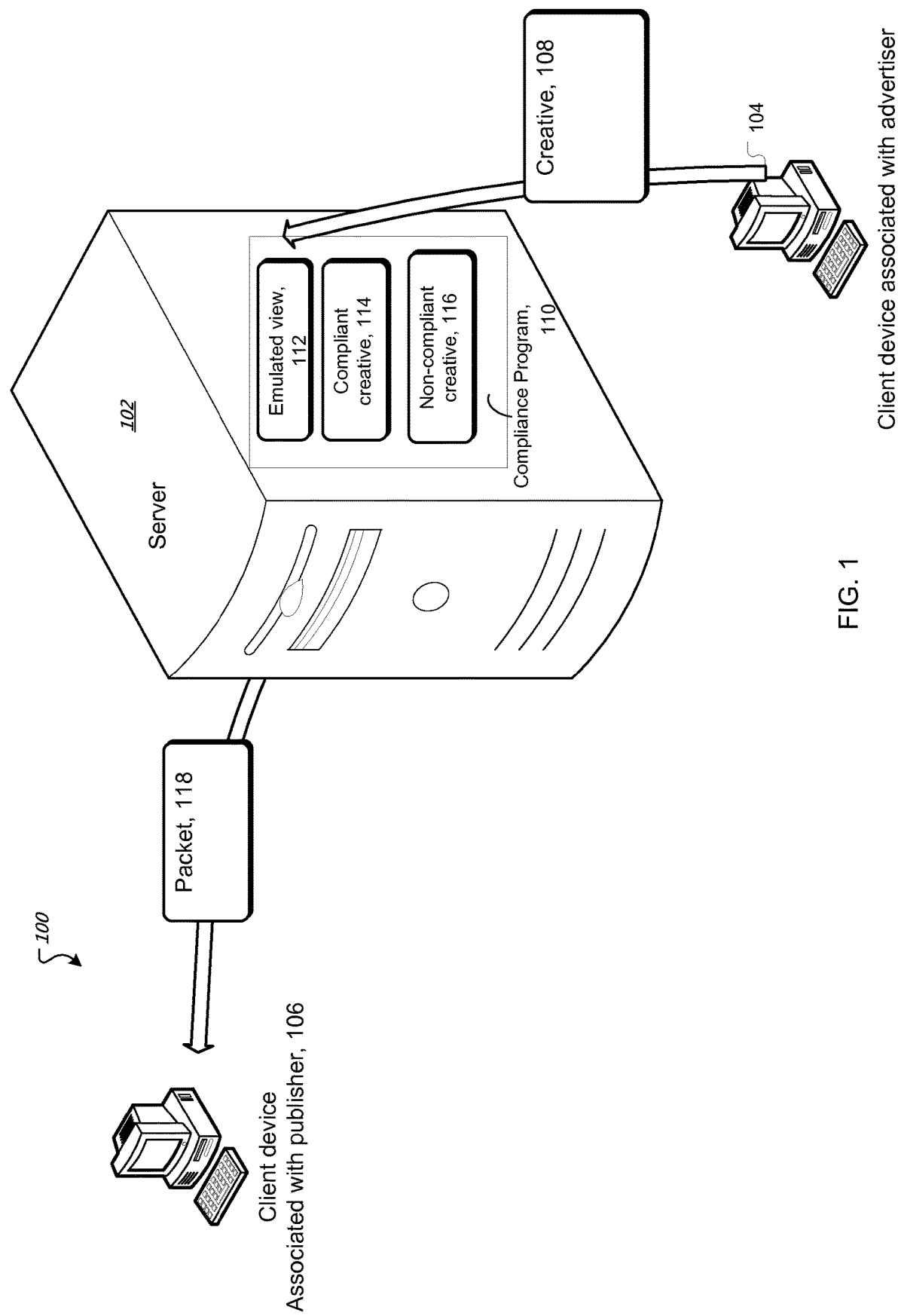
FIG. 1 is a conceptual diagram of a system for determining compliance of a creative with a publisher's pre-defined criteria.

Described herein is a system for verifying whether content included in a creative complies with a publisher's pre-defined criteria. Specifically, the system generates an "emulated view" of the creative by using a virtual machine to emulate a user viewing the creative. In this context, a virtual machine may be a software implementation of a computing device that executes programs in the manner that the programs would be executed by the computing device. Additionally, during a display of the emulated view, the system tracks occurring "events", including, e.g., a number of cookies downloaded to a computing device of the user, a download size of the creative, a number of redirects that occur during a display of the creative, unauthorized requests to uncertified domains (e.g., unknown internet addresses), and so forth.

The system compares the tracked events to a publisher's pre-defined criteria to determine whether a creative complies with the publisher's pre-defined criteria. If the tracked events indicate that a creative complies with the publisher's pre-defined criteria, then the system marks the creative as a "compliant creative" that may be displayed in advertising space of the publisher's website. Generally, a compliant creative is a creative that complies with the publisher's pre-defined criteria. If the tracked events indicate that a creative fails to comply with the publisher's pre-defined criteria, then the system marks the creative as a "non-compliant creative" that may not be displayed in advertising space of the publisher's website. Generally, a non-compliant creative is a creative that fails to comply with the publisher's pre-defined criteria.

Some creatives may be "static" creatives, in which an advertiser does not change content of the creative over time. For static creatives, the system may execute the techniques described herein a single time. Other creatives may be "dynamic" creatives, in which an advertiser changes content of the creative over time, including, e.g., every minute, every hour, every day, every week, and so forth.

Additionally, static creative and dynamic creatives may include "user interface submitted creatives" and/or "real time bidding creatives." Generally, both user interface ("UI") submitted creatives and real time bidding creatives include a UI that is used to submit the creative to the system, for example, to determine whether the creative is a compliant or non-compliant creative. In an example of a UI submitted creative, the UI may include a cut and paste interface that may be used by an advertiser to generate the creative. In an example of a real time bidding creative, a server (e.g., an advertisement server) submits the creative to the system through a hypertext transfer protocol ("HTTP") interface.

To determine whether the changing content of a dynamic creative complies with a publisher's pre-defined criteria, the system may generate emulated views of the changing content of the dynamic creative on an ongoing basis to continually determine whether the dynamic creative is a compliant creative or a non-compliant creative. In an example, the system defines certain time intervals in which to generate an emulated view of the dynamic creative and to track events that occur during generation of the emulated view. These events, which may be tracked at certain time intervals, are compared to the publisher's pre-defined criteria to determine whether a dynamic creative complies with the publisher's pre-defined criteria, for example, as the content of the dynamic creative is changed by an advertiser.

FIG. 1 is a conceptual diagram of system 100 for determining compliance of a creative with a publisher's pre-defined criteria. System 100 includes server 102 and client devices 104, 106. Server 102 is associated with a market-maker of a web advertising marketplace. Client device 104 is associated with an advertiser, and client device 106 is associated with a publisher.

To begin the process of determining whether a creative is a compliant creative or a non-compliant creative, client device 104 sends creative 108 to server 102. Creative 108 includes information indicative of a creative that an advertiser would like to have placed in advertising space on a publisher's website, for example, following the advertiser's successful bidding for the advertising space in a web advertising marketplace.

Server 102 receives creative 108 and executes compliance program 110. Compliance program 110 running on server 102 generates emulated view 112 of creative 108. Based on emulated view 112, compliance program 110 determines whether creative 108 is a compliant creative 114 or a non-compliant creative 116, as described in further detail below.

If the creative 108 is a compliant creative 114, server 102 generates packet 118, which includes information indicative of compliant creative 114. In an example, packet 118 may include numerous data packets. Server 102 may send packet 118 to client device 106, which may display compliant creative 114 in advertising space of a publisher's website.

Figure 2:
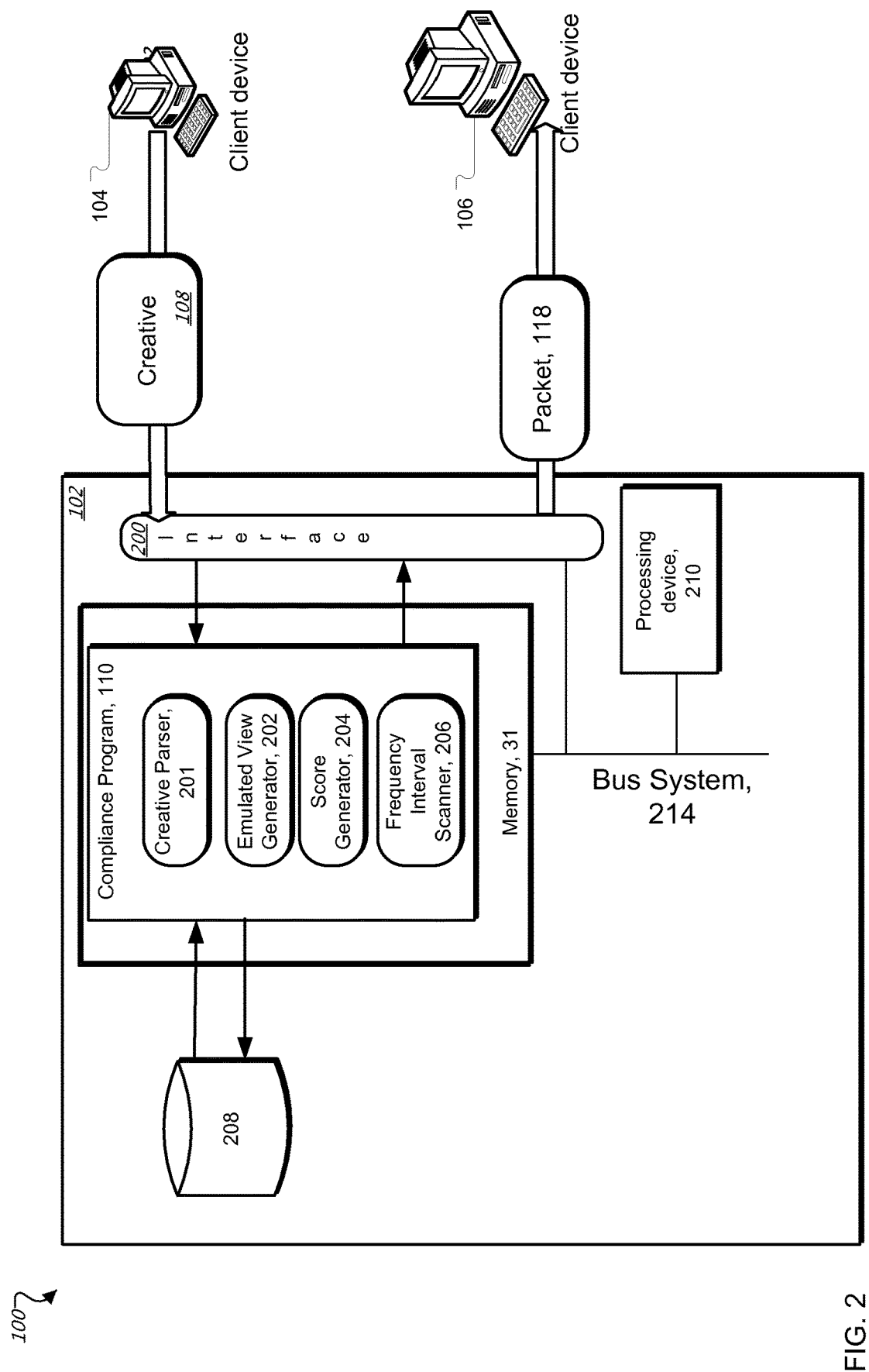
FIG. 2 is a block diagram of components of the system for determining compliance of the creative with the publisher's pre-defined criteria.

FIG. 2 is a block diagram of components of system 100 for determining compliance of a creative with a publisher's pre-defined criteria. Client devices 104, 106 can be any sort of computing devices capable of taking input from a user and communicating over a network (not shown) with server 102 and/or with other client devices. For example, client devices 104, 106 can be mobile devices, desktop computers, laptops, cell phones, personal digital assistants ("PDAs"), servers, embedded computing systems, and so forth. Server 102 can be any of a variety of computing devices capable of receiving information, such as a server, a distributed computing system, a desktop computer, a laptop, a cell phone, a rack-mounted server, and so forth. Server 102 may be a single server or a group of servers that are at a same location or at different locations.

Server 102 can receive information from client device 104 via input/output ("I/O") interface 200. I/O interface 200 can be any type of interface capable of receiving information over a network, such as an Ethernet interface, a wireless networking interface, a fiber-optic networking interface, a modem, and so forth.

Server 102 includes creative parser 201, emulated view generator 202, score generator 204, and frequency interval scanner 206. As described in further detail below, creative parser 201 is configured to parse content of creative 108.

Emulated view generator 202 is configured to generate an emulated view of contents of a creative. Score generator 204 is configured to generate a score value for a creative. Frequency interval scanner 206 is configured to scan data repository 208 for times at which a creative is updated to include updated content.

Server 102 also includes a processing device 210 and memory 212. A bus system 214, including, for example, a data bus and a motherboard, can be used to establish and to control data communication between the components of server 102.

Processing device 210 may include one or more microprocessors. Generally speaking, processing device 210 may include any appropriate processor and/or logic that is capable of receiving and storing data, and of communicating over a network (not shown). Memory 212 can include a hard drive and a random access memory storage device, such as a dynamic random access memory, or other types of non-transitory machine-readable storage devices. As shown in FIG. 2, memory 212 stores computer programs that are executable by processing device 210. Among these computer programs are creative parser 201, emulated view generator 202, score generator 204, and frequency interval scanner 206.

In the example of FIG. 2, creative 108 may include elements indicative of numerous features of creative 108. Specifically, creative 108 may include an identifier element (e.g., "<identifier>") that includes information indicative of a unique identifier for creative 108. Creative 108 may also include a "snippet code" element (e.g., "<snippet code>"), which includes snippet code (e.g., content of a creative and instructions for how a creative should be visually displayed on a client device). For example, the snippet code element may include Hyper-text Markup-up Language ("HTML") code, JavaScript code, Extensible Markup Language ("XML") code, and so forth. In another example, the snippet code element may also include a uniform resource location ("URL") address corresponding to an address at which client device 104 hosts creative 108.

For example, when creative 108 is a dynamic creative, emulated view generator 202 may retrieve updated content for creative 108 from a server associated with the URL address included in the snippet code element. As described in further detail below, emulated view generator 202 is configured to generate an emulated view of a creative. In yet another example, where the snippet code element only includes a URL address, emulated view generator 202 may retrieve a copy of creative 108 by downloading creative 108 from a server associated with the URL address included in the snippet code element.

Creative 108 may also include a creative type element (e.g., "<creative type>") that includes information indicative of whether a creative is a dynamic creative or a static creative. When creative 108 is a dynamic creative, creative 108 may also include a frequency element (e.g., "<frequency>") that includes information indicative of a frequency in which content of the dynamic creative is updated by an advertiser. Thus, in one implementation, an example of creative 108 may include the following information: {<identifier>, <snippet code>, <dynamic creative>, <frequency>}.

In the example of FIG. 2, compliance program 110 also includes creative parser 201. Creative parser 201 is configured to parse information included in creative 108 and to save the parsed information in data repository 208. Referring to Table 1 below, creative 108 may include the following elements: {<identifier="1234">, <snippet code=

"<HTML Set-Cookie: name=login ID, Set-Cookie: name=www.maliciouscookies.com><BODY>CAR ADVERTISEMENT </BODY></HTML>URL=www.car-advertisements.com ">, <creative type="dynamic creative">, and <frequency="every hour">}.

In this example, the snippet code element of creative 108 includes two cookies. One cookie (e.g., Set-Cookie: name=login ID) records a user's login information for a website. Another cookie (e.g., Set-Cookie: name=www.maliciouscookies.com) is a "cookie dropping" cookie that causes the user to receive a third-party cookie from a different website, namely from "www.maliciouscookies.com". The snippet code element of creative 108 also includes a URL address (e.g., URL=www.caradvertisements.com) that includes an address from which updated content of the creative may be retrieved, for example, by emulated view generator 202. Additionally, in this example, creative 108 is a dynamic creative, with content of creative 108 being changed every hour ("frequency=every hour").

Creative parser 201 parses contents of the <identifier>, <snippet code>, <creative type>, and <frequency> elements into corresponding rows in a table stored in data repository 208, an example of which is provided in Table 1:

TABLE 1

| Creative Identifier | Snippet code | Creative type | Frequency | Status Indicator |
|---|---|---|---|---|
| 1234 | <HTML Set-Cookie: name=login ID, Set-Cookie: name=www.maliciouscookies.com> <BODY> CAR ADVERTISEMENT </BODY></HTML> URL = www.caradvertisements.com | dynamic creative | Every hour | Non-scored |

In an example, creative parser 201 also generates a "status indicator" element that includes information indicative of whether a particular creative is a non-compliant creative, a compliant create, and/or a non-scored creative. In the above example of Table 1, the creative associated with the creative identifier of "1234" (referred to herein as "creative 1234") is also associated with a status indicator of "non-scored," indicating that score generator 204 has not yet generated a score value for creative 1234.

As previously described, emulated view generator 202 is configured to generate an emulated view of creative 108. In an example, emulated view generator 202 accesses data repository 208 to determine creatives associated with a status indicator of "non-scored." Emulated view generator 202 then generates emulated views of the creatives associated with the "non-scored" status indicator. In another example, emulated view generator 202 generates an emulated view of a creative in real-time, for example, as the creative is received by server 102.

Emulated view generator 202 may include a virtual machine which is configured to generate an emulated view of creative 102, for example by emulating creative 108 being downloaded onto a client device. In an example, as emulated view generator 202 emulates creative 108 being downloaded onto a client device, emulated view generator 202 also tracks various events that occur during the emulated download of creative 108. For example, emulated view generator 202 tracks a download size (e.g., in kilobytes) of creative 108, a number of cookies downloaded by creative 108, information indicative of whether downloaded cookies are "cookie dropping" cookies, information indicative of whether creative 108 includes instructions to "redirect" a website to another website, and so forth. In an example, emulated view generator 202 may save in data repository 208 information indicative of the events associated with creative 108.

Data repository 208 is also configured to store information indicative of pre-defined criteria for a publisher, examples of which are provided below in Table 2.

TABLE 2

| Publisher Identifier | Criteria 1 | Criteria 2 | ... Criteria N |
|---|---|---|---|
| www.pastaworld.com | No cookie dropping cookies | Download size cannot exceed 50 kilobytes | No more than two redirects |
| www.shinycars.com | No adult content | No malicious software | No fourth party calls to uncertified domains |

As shown above in Table 2, publishers are identified by a "publisher identifier". Table 2 includes information associated with two publishers, namely, the pastaworld publisher (e.g., the publisher associated with the publisher identifier of www.pastaworld.com), and the shinycars publisher (e.g., the publisher associated with the publisher identifier of www.shinycars.com).

As illustrated in Table 2, a publisher identifier may be associated with pre-defined criteria (e.g., criteria 1, criteria 2, . . . criteria N). Score generator 204 is configured to retrieve the pre-defined criteria associated with a particular publisher, for example, the shinycars publisher, and to compare the pre-defined criteria for the particular publisher with the events tracked for creative 108. Based on the comparison, score generator 204 generates a "score value" for creative 108. The score value may include information specifying whether creative 108 is a compliant creative or a non-compliant creative for a particular publisher. Score value may include the following format: score value={publisher identifier: [compliant or non-compliant]}. In an example, the score value may also include information indicative of a list of publishers, if any, that will accept creative 108 for display in the publisher's advertisement space, e.g., because creative 108 is a compliant creative for that particular publisher.

Referring back to Table 1, the snippet code element for creative 1234 includes a cookie dropping cookie. Now, referring to Table 2, the pastaworld publisher includes a policy of "no cookie dropping cookies." In this example, score generator 204 scores creative 1234 as a non-compliant creative for the pastaworld publisher. Specifically, score generator 204 generates a score value for creative 1234, namely, score value={pastaworld publisher: non-compliant}.

Still referring to Table 2, the shinycars publisher does not include a policy of "no cookie dropping cookies." Therefore, in this example, score generator 204 scores creative 1234 as a compliant creative for the shinycars publisher. Specifically, score generator 204 generates another score value for creative 1234, namely, score value={shinycars publisher: compliant}.

As indicated below in Table 3, the status indicator for creative 1234 is updated with the score values generated by score generator 204.

TABLE 3

| Creative Identifier | Snippet code | Creative type | Frequency | Status Indicator |
|---|---|---|---|---|
| 1234 | URL = www.caradvertisements.com | dynamic creative | Every hour | shinycars publisher: compliant pastaworld publisher: non-compliant |

As indicated above in Table 3, contents of the snippet code element may also be updated to include only a URL value, namely, URL=www.caradvertisements.com. For example, because creative 1234 is a dynamic creative in which the contents of the snippet code element change every hour, the contents of the snippet code element as initially included in creative 108 may not reflect a current content for creative 1234. Accordingly, the contents of the snippet code element can be updated to include a link to the URL address that hosts creative 1234, enabling emulated view generator 202 to download updated contents for creative 1234 directly from the URL address.

Frequency interval scanner 206 is configured to scan data repository 208 for creatives associated with a "creative type" of "dynamic creative," such as, for example, creative 1234 as indicated in the above Table 1. For the creatives associated with a "creative type" of "dynamic creative," frequency interval scanner 206 also determines the frequency with which the content of these creatives is updated by an advertiser, for example, based on information included in the frequency element (see Table 1) and/or other frequency information stored in data repository 208. When frequency interval scanner 206 determines that a current time corresponds to a time in which a creative includes updated content, frequency interval scanner 206 sends a request to emulated view generator 202 to obtain the updated content for the creative.

Using creative 1234 (see Table 1) as an example, emulated view generator 202 may send a request (not shown) to client device 104 for updated content of creative 1234. In another example, emulated view generator 202 may retrieve, from data repository 208, a URL address included in the snippet code element for creative 1234. In this example, emulated view generator 202 generates an "updated" emulated view of creative 1234 by downloading, from the URL address included in the snippet code element, updated contents (e.g., updated contents of the snippet code element) for creative 1234. Score generator 204 generates an updated score value for the updated emulated view of creative 1234 using the techniques described herein.

Figure 3:
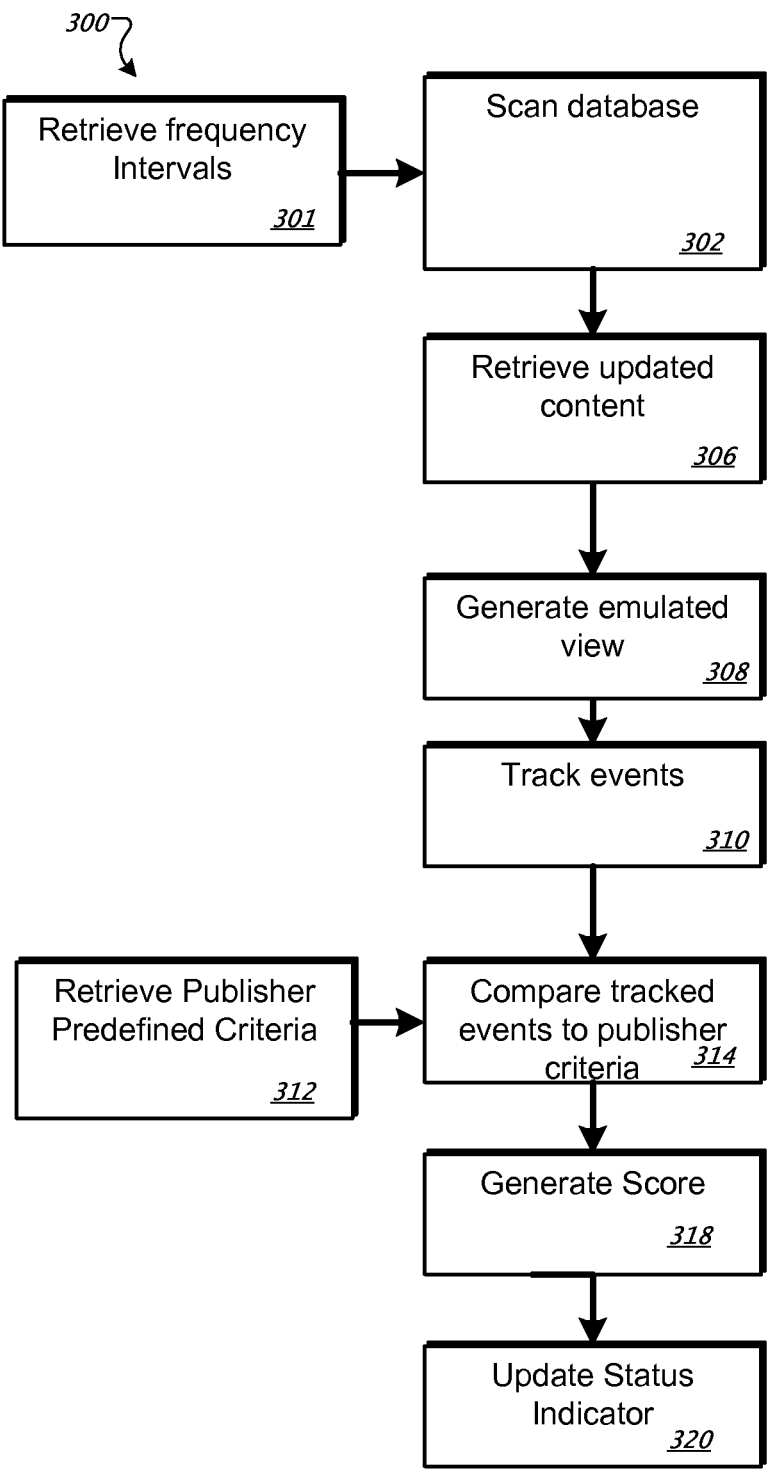
FIG. 3 is a flowchart of a process executed by a compliance program for determining whether a creative is a compliant creative or a non-compliant creative.

FIG. 3 is a flowchart of a process 300 implemented by compliance program 110 for determining whether a creative is a compliant creative or a non-compliant creative. In operation, frequency interval scanner 206 retrieves, from data repository 208 (301). This "frequency information" may include, e.g., information indicative of a frequency in which content of a particular creative (e.g., creative 1234) is updated by an advertiser. To accomplish this, frequency interval scanner may retrieve information included in a frequency element for the particular creative.

Based on the frequency information, frequency interval scanner 206 scans data repository 208 to identify an "updated creative" (302). The updated creative may be, for example, a creative for which an advertiser has provided updated content for the creative. Frequency interval scanner 206 passes information indicative of an identity of the updated creative to emulated view generator 202. In response, emulated view generator 202 retrieves updated content for the updated creative (306). For example, emulated view generator 202 may retrieve the updated content by accessing a URL address included in the snippet code element (306), such as is shown in Table 2.

Based on the updated content, emulated view generator 202 generates an emulated view for the updated creative (308). Emulated view generator 202 also tracks events occurring during a generation of the emulated view (310). For example, emulated view generator 202 may pass information indicative of the tracked events to score generator 204. Score generator 204 retrieves, from data repository 208, pre-defined criteria for a publisher (312). Score generator 204 compares the tracked events to the pre-defined criteria (314). Based on the comparison, score generator 204 generates a score value for the creative (316). Score generator 204 updates a status indicator that is associated with the creative with the generated score value (318).

In a variation of the process 300 of FIG. 3, frequency interval scanner 206 scans (302) data repository 208 for creatives associated with a status indicator of "non-scored." Emulated view generator 202 may retrieve content for a particular creative from data repository 208 (306). For example, the content may be retrieved from the snippet code element shown in Table 1. The remaining actions shown in FIG. 3 may be executed as described above.

Figure 4:
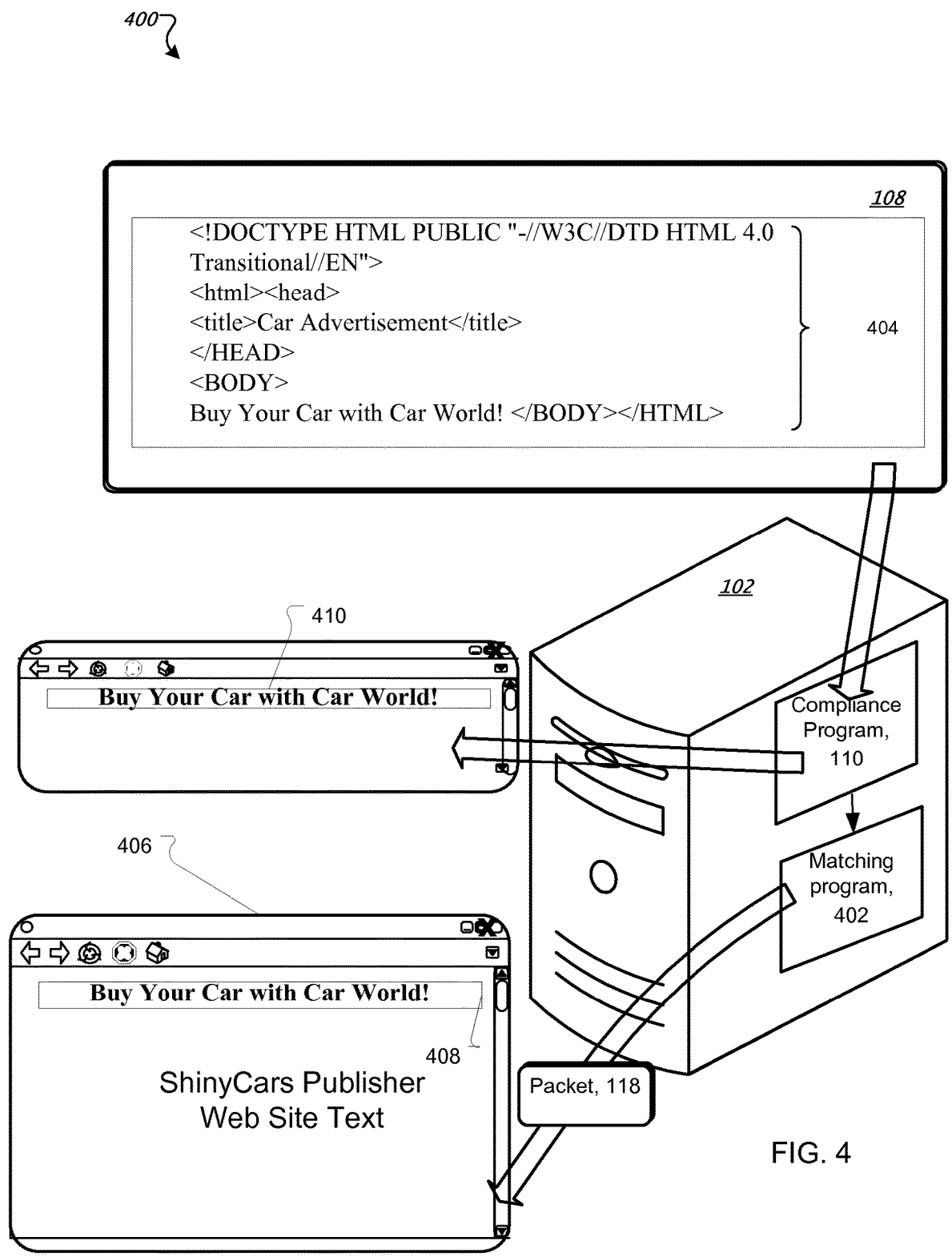
FIG. 4 shows an online marketplace for determining compliant creatives in the process of FIG. 3.

FIG. 4 shows an online marketplace 400 for determining compliant creatives using the process of FIG. 3. Online marketplace 400 includes server 102. Server 102 includes compliance program 110 (FIGS. 1 and 2). Server 102 also includes matching program 402 (not shown in FIGS. 1 and 2). Matching program 402 is configured to "match" offer prices from publishers with bid prices from advertisers. When matching program 402 determines a match between a publisher's offer price and an advertiser's bid price, the publisher is sent (e.g., in real-time) the advertiser's creative, and the publisher displays the advertiser's creative in the advertisement space on the publisher's website.

In the example of FIG. 4, creative 108 is generated by an advertiser associated with client device 104 (not shown in FIG. 4) and includes snippet code 404. Snippet code 404 does not include any redirects and/or cookie dropping cookies. Additionally, snippet code 404 had a download size of less than fifty kilobytes. Snippet code 404 also includes instructions to display the following text: "Buy Your Car with Car World!" The advertiser submits a bid price, which is associated with creative 108, to server 102, for example, by client device 104.

Compliance program 110 executes the process of FIG. 3 to determine whether creative 108 is a compliant creative for various publishers offering advertising space. Specifically, emulated view generator 202 (FIG. 2) uses snippet code 404 to generate emulated view 410 of creative 108.

In an example, the publishers offering advertising space include the publishers listed in Table 2 above, namely, the pastaworld publisher and the shinycars publisher. In this example, compliance program 110 determines that creative 108 is a compliant creative for the pastaworld publisher, because snippet code 404 matches the pre-defined criteria of the pastaworld publisher. Specifically, snippet code 404 includes no cookie dropping cookies, has a download size that does not exceed 50 kilobytes, and includes no more than two redirects (see Table 2).

Compliance program 110 also determines that creative 108 is a compliant creative for the shinycars publisher, because snippet code 404 matches the pre-defined criteria of the shinycars publisher. Specifically, snippet code 404 includes no adult content, no malicious software, and no fourth party calls to uncertified domains (see Table 2).

In the example of FIG. 4, both the pastaworld publisher and the shinycars publisher submit offers, including offer prices, for creative 108 to be displayed on advertising space of the respective publishers' website. The offers may be submitted to server 102, for example. In this example, matching program 402 matches the advertiser's bid price for creative 108 with the shinycars publisher's offer price. Server 102 generates packet 118, which includes information indicative of creative 108 and snippet code 404. Packet 118 is sent to client device 106 (not shown in FIG. 4), which in this example is associated with the shinycars publisher. The shinycars publisher publishes website 406, which includes advertising space 408 for a creative. In this example, the shinycars publisher displays the content of snippet code 404, namely the text "Buy Your Car with Car World!", in advertising space 406.

Using the techniques described herein, compliance program 110 generates an emulated view of a creative to determine in real-time whether the creative is a compliant creative or a non-compliant creative. Additionally, the techniques described herein may be used for both static and dynamic creatives. For dynamic creatives, the techniques described herein may be periodically executed to determine whether the dynamic creative is a compliant creative or a non-compliant creative, for example, as content of the dynamic creative is changed by an advertiser.

Figure 5:
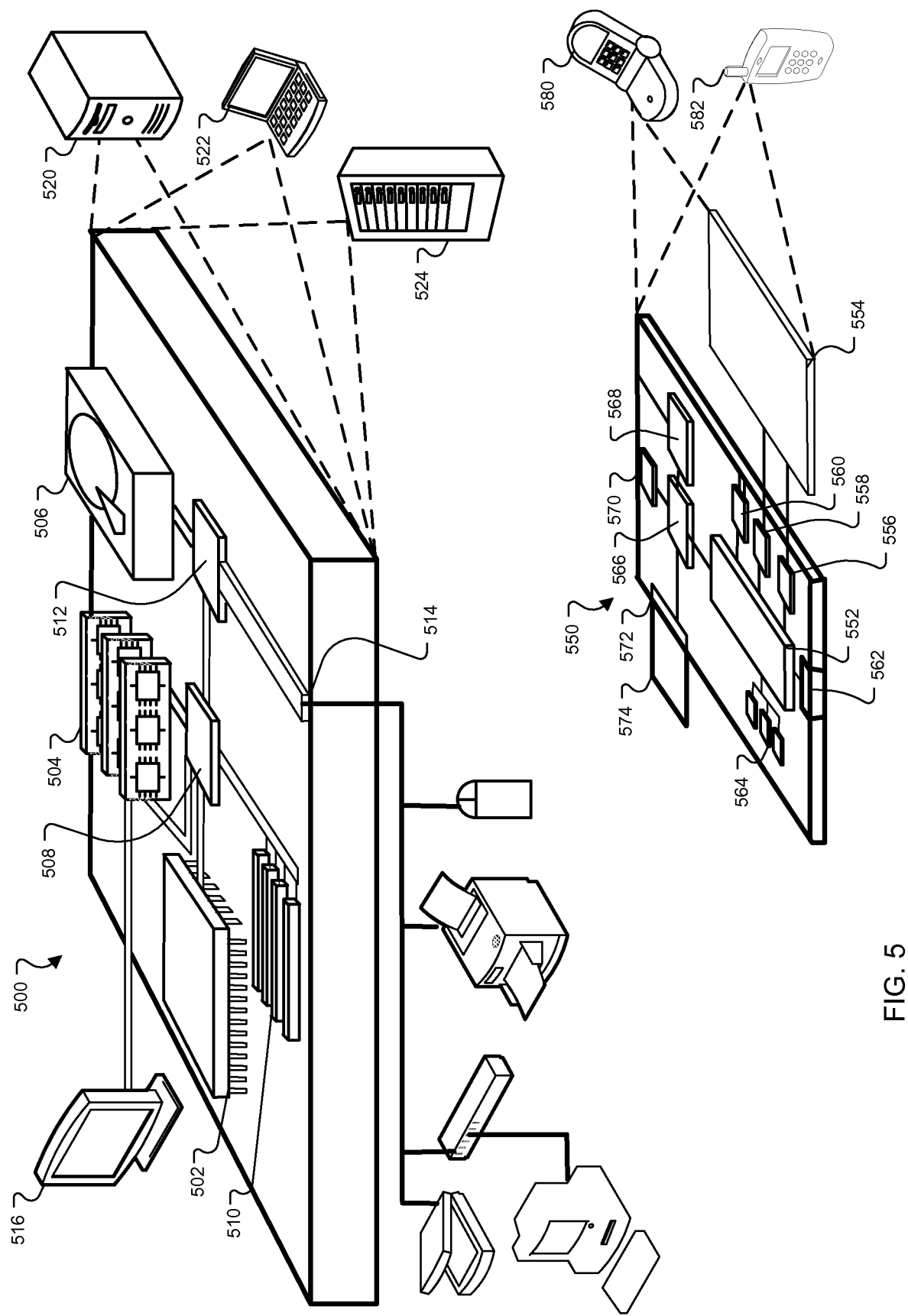
FIG. 5 shows an example of a computer device and a mobile computer device that can be used to implement the techniques described herein.

FIG. 5 shows an example of a computing device 500 and a mobile computing device 550 that may be used with the techniques described here. Computing device 500 is intended to represent various forms of digital computers, such as laptops, desktops, workstations, personal digital assistants, servers, blade servers, mainframes, and other appropriate computers. Mobile computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the processes and techniques described herein. For example, compliance program 110 and matching program 402 may be implemented on separate servers, with matching program 402 being implemented on an external server. In this example, compliance program 110 sends data indicative of whether a creative is a compliant creative or a non-compliant creative to the external server running matching program 110.

In another example, the system described herein is used to validate advertisement technologies, including, e.g., a set of domains which a creative (e.g., snippet code included in a creative) may call out to via a protocol (e.g., the HTTP protocol). These call outs are often referred to as third or fourth party ad technologies.

For example, a creative may call out to an advertisement server www.adserver.net/richmedia in order to retrieve content (e.g., flash content) as part of the creative. In this example, the system uses the techniques described herein to validate that advertisement technologies, which comply with a publisher's pre-defined criteria, are employed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although a few implementations have been described in detail above, other modifications are possible. Moreover, other mechanisms for editing voice may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other embodiments not specifically described herein are also within the scope of the following claims.

What is claimed is:

1. A method comprising:
   accessing, over the Internet with a network location of a data repository, entries representing advertisements that are modified over time, each entry comprising an element that indicates whether that entry has been modified to include updated content;
   scanning the entries accessed from the data repository to select an entry of an advertisement that has been modified, as indicated by the element for the entry, to include updated content;
   emulating, by one or more processors, the advertisement represented in the selected entry by:
      from the network location, downloading snippet code of the advertisement that is configured to be executed when the advertisement is displayed; and
      generating an emulated view of the advertisement and executing the snippet code of the advertisement;
   retrieving publisher defined criteria for advertisement display in respective websites of a plurality of publishers that specify information indicative of a threshold number of redirects allowed to be caused by advertisements; and
   determining that the snippet code of the advertisement is in compliance with the publisher defined criteria by determining that execution of the snippet code does not cause the threshold number of redirects to be violated;
   generating, by the one or more processors, validation data comprising identifiers representing each publisher of the plurality of publishers that specify the publisher defined criteria that includes the threshold number of redirects allowed to be caused by the advertisements based on the determination that execution of the snippet code does not cause the threshold number of redirects to be violated; and
   storing, in the selected entry of the data repository, the validation data.

2. The method of claim 1, further comprising:
   receiving information indicative of the advertisement; and
   associating the information indicative of the advertisement with one or more status indicators.

3. The method of claim 2, wherein the one or more status indicators comprise information indicative of a compliance of the advertisement with the publisher defined criteria.

4. The method of claim 3, wherein the advertisement comprises a first advertisement, and wherein the method further comprises:
   determining that a current time corresponds to a time specified by a time interval;
   scanning the one or more status indicators to determine one or more second advertisements associated with a non-compliant status indicator;
   retrieving one or more events associated with at least one of the one or more second advertisements; and
   comparing the one or more events to the one or more publisher defined criteria.

5. The method of claim 1, further comprising:
   prior to retrieving the publisher defined criteria for advertisement display in respective websites of the plurality of publishers, detecting, based on the emulated view, that the snippet code is configured to cause a remote device to receive one or more third party cookies from a website that differs from a website in which the advertisement is being displayed.

6. The method of claim 1, wherein the publisher defined criteria further comprises information indicative of a policy prohibiting an installation of malicious software.

7. The method of claim 1, further comprising:
   generating, by the one or more processors, a score value associated with the advertisement, wherein the score value comprises information indicative of whether the advertisement complies with the publisher defined criteria.

8. A system comprising:
one or more processing devices; and
one or more machine-readable media storing instructions that are executable by the one or more processing devices to perform operations comprising:
  accessing, over the Internet with a network location of a data repository, entries representing advertisements that are modified over time, each entry comprising an element that indicates whether that entry has been modified to include updated content;
  scanning the entries accessed from the data repository to select an entry of an advertisement that has been modified, as indicated by the element for the entry, to include updated content;
  emulating the advertisement represented in the selected entry by:
    from the network location, downloading snippet code of the advertisement that is configured to be executed when the advertisement is displayed; and
    generating an emulated view of the advertisement and executing the snippet code of the advertisement;
  retrieving publisher defined criteria for advertisement display in respective websites of a plurality of publishers that specify information indicative of a threshold number of redirects allowed to be caused by advertisements; and
  determining that the snippet code of the advertisement is in compliance with the publisher defined criteria by determining that execution of the snippet code does not cause the threshold number of redirects to be violated;
  generating, by the one or more processors, validation data comprising identifiers representing each publisher of the plurality of publishers that specify the publisher defined criteria that includes the threshold number of redirects allowed to be caused by the advertisements; and
  storing, in the selected entry of the data repository, the validation data.

9. The system of claim 8, wherein the operations further comprise:
  receiving information indicative of the advertisement; and
  associating the information indicative of the advertisement with one or more status indicators.

10. The system of claim 9, wherein the one or more status indicators comprise information indicative of a compliance of the advertisement with the publisher defined criteria.

11. The system of claim 10, wherein the advertisement comprises a first advertisement, and wherein the operations further comprise:
  determining that a current time corresponds to a time specified by a time interval;
  scanning the one or more status indicators to determine one or more second advertisements associated with a non-compliant status indicator;
  retrieving one or more events associated with at least one of the one or more second advertisements; and
  comparing the one or more events to the one or more publisher defined criteria.

12. The system of claim 8, wherein the operations further comprise:
  prior to retrieving the publisher defined criteria for advertisement display in respective websites of the plurality of publishers, detecting, based on the emulated view, that the snippet code is configured to cause a remote device to receive one or more third party cookies from a website that differs from a website in which the advertisement is being displayed.

13. The system of claim 8, wherein the publisher defined criteria further comprises information indicative of a policy prohibiting an installation of malicious software.

14. The system of claim 8, wherein the operations further comprise:
  generating a score value associated with the advertisement, wherein the score value comprises information indicative of whether the advertisement complies with the publisher defined criteria.

15. A non-transitory machine-readable storage device storing instructions that are executable by one or more processing devices of an online advertising system to perform operations comprising:
  accessing, over the Internet with a network location of a data repository, entries representing advertisements that are modified over time, each entry comprising an element that indicates whether that entry has been modified to include updated content;
  scanning the entries accessed from the data repository to select an entry of an advertisement that has been modified, as indicated by the element for the entry, to include updated content;
  emulating the advertisement represented in the selected entry by:
    from the network location, downloading snippet code of the advertisement that is configured to be executed when the advertisement is displayed; and
    generating an emulated view of the advertisement and executing the snippet code of the advertisement;
  retrieving publisher defined criteria for advertisement display in respective websites of a plurality of publishers that specify information indicative of a threshold number of redirects allowed to be caused by advertisements; and
  determining that the snippet code of the advertisement is in compliance with the publisher defined criteria by determining that execution of the snippet code does not cause the threshold number of redirects to be violated;
  generating, by the one or more processors, validation data comprising identifiers representing each publisher of the plurality of publishers that specify the publisher defined criteria that includes the threshold number of redirects allowed to be caused by the advertisements; and
  storing, in the selected entry of the data repository, the validation data.

16. The non-transitory machine-readable storage device of claim 15, wherein the operations further comprise:
  receiving information indicative of the advertisement; and
  associating the information indicative of the advertisement with one or more status indicators, wherein the one or more status indicators comprise information indicative of a compliance of the advertisement with the publisher defined criteria.

17. The non-transitory machine-readable storage device of claim 16, wherein the advertisement comprises a first advertisement, and wherein the operations further comprise:
  determining that a current time corresponds to a time specified by a time interval;
  scanning the one or more status indicators to determine one or more second advertisements associated with a non-compliant status indicator;
  retrieving one or more events associated with at least one of the one or more second advertisements; and comparing the one or more events to the one or more publisher defined criteria.

18. The non-transitory machine-readable storage device of claim 15, wherein the operations further comprise:
prior to retrieving the publisher defined criteria for advertisement display in respective websites of the plurality of publishers, detecting, based on the emulated view, that the snippet code is configured to cause a remote device to receive one or more third party cookies from a website that differs from a website in which the advertisement is being displayed.

19. The non-transitory machine-readable storage device of claim 15, wherein the publisher defined criteria further comprises information indicative of a policy prohibiting an installation of malicious software.

20. The non-transitory machine-readable storage device of claim 15, wherein the operations further comprise:
generating a score value associated with the advertisement, wherein the score value comprises information indicative of whether the advertisement complies with the publisher defined criteria.

\* \* \* \* \*